United States Patent
Niyazov et al.

(10) Patent No.: US 12,339,817 B2
(45) Date of Patent: Jun. 24, 2025

(54) METHODS AND SYSTEMS FOR IDENTIFYING AND CORRECTING ANOMALIES IN A DATA ENVIRONMENT

(71) Applicant: Charter Communications Operating, LLC, St. Louis, MO (US)

(72) Inventors: Irina Niyazov, Commack, NY (US); Michael Bender, Rye Brook, NY (US); Manoj Acharya, Charlotte, NC (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 17/899,235

(22) Filed: Aug. 30, 2022

(65) Prior Publication Data
US 2024/0070130 A1    Feb. 29, 2024

(51) Int. Cl.
*G06F 17/00* (2019.01)
*G06F 16/215* (2019.01)
*G06F 16/23* (2019.01)
*G06F 16/2458* (2019.01)

(52) U.S. Cl.
CPC ........ *G06F 16/215* (2019.01); *G06F 16/2365* (2019.01); *G06F 16/2462* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| | | | |
|---|---|---|---|
| 7,885,915 B2 | 2/2011 | Parson et al. | |
| 10,459,827 B1 | 10/2019 | Aghdaie et al. | |
| 11,280,816 B2 * | 3/2022 | Natsumeda | G01R 31/56 |
| 11,379,284 B2 * | 7/2022 | Cheng | H04L 67/12 |
| 11,494,850 B1 * | 11/2022 | Fontenot | G06Q 40/125 |
| 12,026,076 B2 * | 7/2024 | Sahni | G06F 11/3006 |
| 2012/0137367 A1 * | 5/2012 | Dupont | G06F 21/00 726/25 |
| 2019/0324068 A1 * | 10/2019 | Natsumeda | G01R 21/133 |
| 2019/0342311 A1 * | 11/2019 | Muddu | H04L 43/045 |
| 2019/0370610 A1 * | 12/2019 | Batoukov | G06F 11/0709 |
| 2019/0379699 A1 | 12/2019 | Katragadda et al. | |
| 2020/0126037 A1 * | 4/2020 | Tatituri | G06N 20/00 |
| 2021/0117232 A1 * | 4/2021 | Sriharsha | G06F 16/1734 |
| 2021/0117416 A1 * | 4/2021 | Sriharsha | G06N 20/00 |
| 2021/0208995 A1 * | 7/2021 | de Abreu Pinho | G06F 18/22 |
| 2021/0232906 A1 * | 7/2021 | Shaabana | G06N 3/006 |
| 2021/0365968 A1 * | 11/2021 | Narula | G06Q 30/0201 |
| 2022/0012626 A1 * | 1/2022 | Ben-Itzhak | G06V 10/77 |
| 2022/0027386 A1 * | 1/2022 | Jagannathan | G06F 16/2379 |
| 2022/0086180 A1 * | 3/2022 | Karpovsky | H04L 63/1425 |

(Continued)

*Primary Examiner* — Hung D Le
(74) *Attorney, Agent, or Firm* — THE MARBURY LAW GROUP, PLLC

(57) ABSTRACT

A computing device may be configured to continuously, repeatedly, or recursively generate, train, improve, focus, or refine the machine learning classifier models that are used data anomalies. The computing device may create a corpus of data based on architecture or standards documents, generate classifier models based on the corpus of data, collect information from one or more data sources, generate feature vectors based on the collected information, apply the feature vectors to the classifier models to generate an analysis result, and identify a data anomaly based on the generated analysis result.

19 Claims, 11 Drawing Sheets

(56) References Cited

U.S. PATENT DOCUMENTS

| | | | | |
|---|---|---|---|---|
| 2022/0114593 | A1* | 4/2022 | Johnson | G06F 18/24133 |
| 2022/0129606 | A1* | 4/2022 | Sundararajan | G06F 30/27 |
| 2022/0198263 | A1* | 6/2022 | Guo | G06Q 50/01 |
| 2022/0303288 | A1* | 9/2022 | Wang | G06N 3/08 |
| 2022/0309387 | A1* | 9/2022 | Rodriguez | H04L 9/3213 |
| 2022/0342868 | A1* | 10/2022 | Gonzalez Macias | G06F 16/24568 |
| 2022/0366430 | A1* | 11/2022 | Steckel | H04M 7/0078 |
| 2022/0405619 | A1* | 12/2022 | Ramamurthy | G06F 16/9024 |
| 2023/0291657 | A1* | 9/2023 | Cawley | H04L 41/0883 |
| 2023/0306085 | A1* | 9/2023 | Paglieroni | G06F 18/2185 382/207 |
| 2023/0316112 | A1* | 10/2023 | Stocker | G06F 16/283 706/11 |
| 2023/0410143 | A1* | 12/2023 | Retinraj | G06Q 30/0244 |

* cited by examiner

METHODS AND SYSTEMS FOR IDENTIFYING AND CORRECTING ANOMALIES IN A DATA ENVIRONMENT

BACKGROUND

Organizations rely on data to make business decisions. The quality of the data may have a direct impact on the effectiveness of such decisions. Data quality is most impacted by data anomalies, which may be the result of system errors, human errors, not following standards, etc. Data anomalies may also have a negative impact on performance, maintenance, time to market, etc.

Manual identification of data anomalies is extremely time consuming and prone to errors (e.g., due to constant modification of the data environment, etc.). In addition, when dealing with millions of data points across many permutations, it may be extremely challenging to determine where and how the data is being changed. As such, identifying data anomalies in large ever-changing data sets may require running an analytics platform and/or detection algorithms at multiple locations within a data pipeline.

SUMMARY

The various aspects include methods of detecting and responding to data anomalies, which may include creating a corpus of data based on architecture or standards documents, generating classifier models based on the corpus of data, collecting information from one or more data sources, generating feature vectors based on the collected information, applying the feature vectors to the classifier models to generate an analysis result, and identifying a data anomaly based on the generated analysis result.

In some aspects, the methods may include updating the classifier models based on the identified data anomaly or generated analysis result. In some aspects, creating the corpus of data based on the architecture or standards documents may include using natural language processing and supervised learning to create the corpus of data.

In some aspects, the methods may include generating an alert based on the identified data anomaly, receiving feedback in response to generating the alert, and updating the corpus of data based on the received feedback. In some aspects, generating the alert based on the identified data anomaly may include determining a cluster that includes a significance score that exceeds a threshold value, identifying a data consumer or data producer that has a registered interest in the data, and alerting the identified data consumer or data producer of the identified data anomaly.

In some aspects, the methods may include performing autonomous learning of critical metrics by periodically evaluating a behavior of a critical metric, classifying the critical metric based on a result of the evaluation, and correlating the critical metric with a model from a library of model types for different signal types. In some aspects, correlating the critical metric with the model from the library of model types for different signal types may include performing a combination of abnormal correlation, naming correlation, graph correlation, and implicit analytics topology.

Further aspects may include a computing device having a processor configured with processor-executable instructions to perform various operations corresponding to the methods discussed above.

Further aspects may include a non-transitory processor-readable storage medium having stored thereon processor-executable instructions configured to cause a processor to perform various operations corresponding to the method operations discussed above.

BRIEF DESCRIPTION OF THE DRAWINGS

The accompanying drawings, which are incorporated herein and constitute part of this specification, illustrate exemplary aspects of the claims, and together with the general description given above and the detailed description given below, serve to explain the features of the claims.

DETAILED DESCRIPTION

Figure 1:
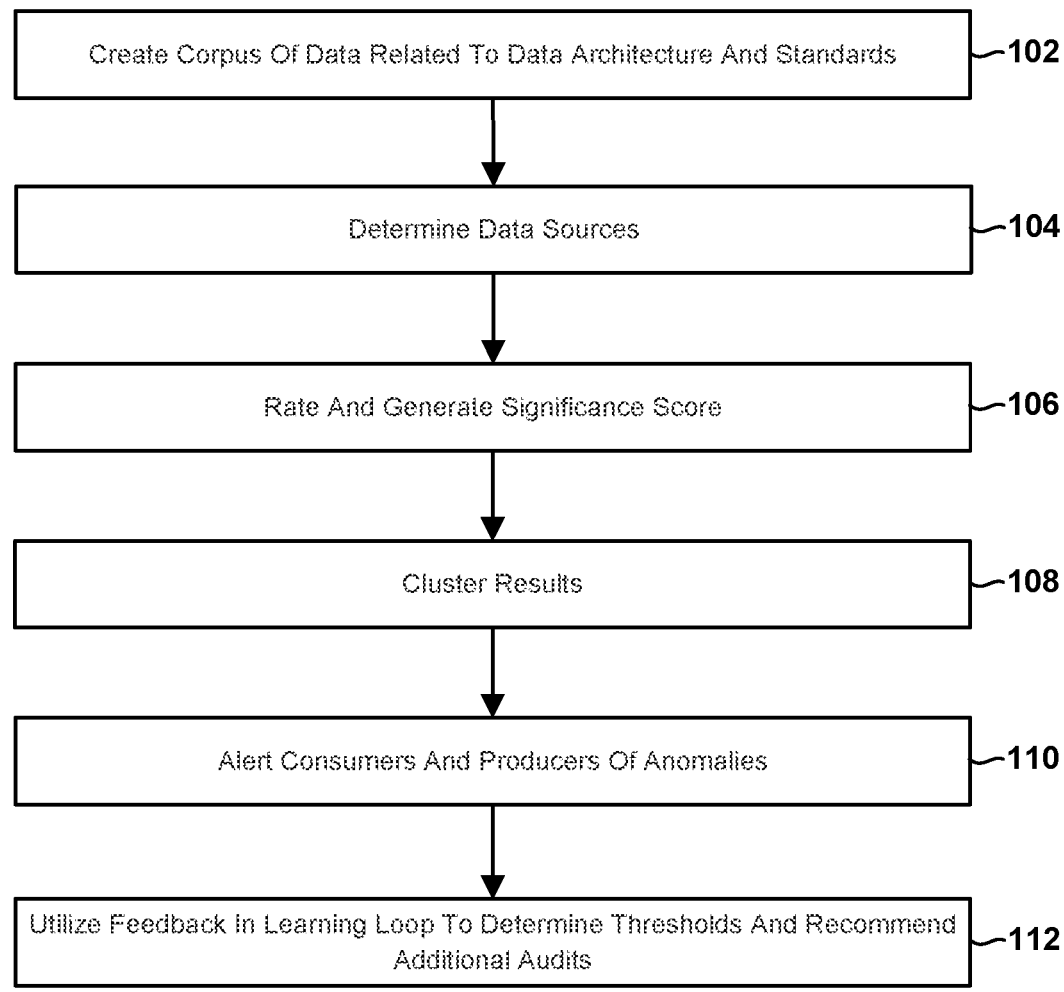
FIGS. 1-7 are process flow diagrams illustrating methods of updating and responding to data anomalies in accordance with the various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In overview, the various aspects include methods, and computing devices configured to implement the methods, of using machine learning techniques to identify and correct data anomalies in a data environment. A computing device may be configured to identify data anomalies and non-compliance with architectural standards relating to a data environment, generate a compliant data environment, and use the compliant data environment to create or run an intelligent analysis and rules recommendation engine that identifies and/or corrects data anomalies.

In some embodiments, the computing device may be configured to continuously analyze and update the data environment, its data structures, data fields, and/or data values. In some embodiments, the computing device may be configured to train classifier models, use data collected from the data environment to generate feature vectors, apply the generated feature vectors to the trained classifier models to generate analysis results. The computing device may use the generated analysis results to identify data patterns and potential data anomalies, determine confidence values for classifying the collected data as abnormal, and train new classifier models. The computing device may repeat the above-described operations until the resulting confidence values indicate that classifier models (or the results generated by them) provides a desired level of accuracy in data anomaly detection.

In some embodiments, the computing device may be configured to perform artificial intelligence (AI) generated data quality checks. Performing the AI-generated data quality checks may include performing a combination of statistical anomaly detection and rule-based algorithms. The computing device may automatically recommend and/or improve further data quality checks based on the results of the AI-generated data quality checks.

In some embodiments, the computing device may be configured to generate or create a corpus of information related to the data standards and architecture, collect data from sources that are to be analyzed, determine a set of norms for the data, correlate the anomalies into groups, and alert consumers of the information to anomalies. In some embodiments, the computing device may utilize natural language processing (NLP) and supervised learning to create the corpus of information related to the data standards and architecture. The computing device may ingest data standards as produced by an architecture or standards organization. In some embodiments, the computing device may accomplish this by identifying sources of truth from the organization, ingesting them into an AI system to classify the data standards, reviewing the classifications to ensure proper corpus generation, and storing an approved corpus for future use by the computing device.

In some embodiments, the computing device may be configured to update and enrich the corpus of information as new data sources and new rules are generated. In some embodiments, the computing device may ingest updated or supplemental standards as they are produced. Utilizing the same or similar processes as in the original corpus generation, the computing device may provide updated definitions to be utilized by the computing device. In various embodiments, these new recommendations may be accepted (and implemented) or rejected.

In some embodiments, the computing device may be configured to utilize reinforcement learning techniques to identify norms. In these embodiments, the computing device may update the corpus as responses to previous recommendations are processed. In instances in which a generated rule in the corpus may be later determined by ignoring a defined threshold of recommendations, the corpus may be updated to not include those recommendations in the future.

In some embodiments, the computing device may be configured to update the corpus of information based on feedback from consumer responses to the detected anomalies.

The term "computing device" may be used herein to refer to any one or all of server computing devices, edge devices, Internet access gateways, modems, routers, network switches, residential gateways, access points, integrated access devices (IAD), mobile convergence products, networking adapters, multiplexers, personal computers, laptop computers, tablet computers, user equipment (UE), smartphones, personal or mobile multi-media players, personal data assistants (PDAs), palm-top computers, wireless electronic mail receivers, multimedia Internet enabled cellular telephones, gaming systems (e.g., PlayStation™ Xbox™, Nintendo Switch™, etc.), wearable devices (e.g., smartwatch, head-mounted display, fitness tracker, etc.), IoT devices (e.g., smart televisions, smart speakers, smart locks, lighting systems, smart switches, smart plugs, smart doorbells, smart doorbell cameras, smart air pollution/quality monitors, smart smoke alarms, security systems, smart thermostats, etc.), media players (e.g., DVD players, ROKU™, AppleTV™, etc.), digital video recorders (DVRs), automotive heads up displays, portable projectors, 3D holographic displays, and other similar devices that include a programmable processor and communications circuitry for providing the functionality described herein.

The term "neural network" may be used herein to refer to an interconnected group of processing nodes (or neuron models) that collectively operate as a software application or process that controls a function of a computing device and/or generates an overall inference result as output. Individual nodes in a neural network may attempt to emulate biological neurons by receiving input data, performing simple operations on the input data to generate output data, and passing the output data (also called "activation") to the next node in the network. Each node may be associated with a weight value that defines or governs the relationship between input data and output data. A neural network may learn to perform new tasks over time by adjusting these weight values. In some cases, the overall structure of the neural network and/or the operations of the processing nodes do not change as the neural network learns a task. Rather, learning is accomplished during a "training" process in which the values of the weights in each layer are determined. As an example, the training process may include causing the neural network to process a task for which an expected/desired output is known, comparing the activations generated by the neural network to the expected/desired output, and determining the values of the weights in each layer based on the comparison results. After the training process is complete, the neural network may begin "inference" to process a new task with the determined weights.

The term "inference" may be used herein to refer to a process that is performed at runtime or during execution of the software application program corresponding to the neural network. Inference may include traversing the processing nodes in the neural network along a forward path to produce one or more values as an overall activation or overall "inference result."

The term "artificial intelligence (AI) model" may be used herein to refer to wide variety of information structures that may be used by a computing device to perform a computation or evaluate a specific condition, feature, factor, dataset, or behavior on a device. Examples of AI models include network models, neural network models, inference models, neuron models, classifiers, random forest models, spiking neural network (SNN) models, convolutional neural network (CNN) models, recurrent neural network (RNN) models, deep neural network (DNN) models, generative network models, and genetic algorithm models. In some embodiments, an AI model may include an architectural definition (e.g., the neural network architecture, etc.) and one or more weights (e.g., neural network weights, etc.).

The term "deep neural network" may be used herein to refer to a neural network that implements a layered architecture in which the output/activation of a first layer of nodes becomes an input to a second layer of nodes, the output/activation of a second layer of nodes becomes an input to a third layer of nodes, and so on. As such, computations in a deep neural network may be distributed over a population of processing nodes that make up a computational chain. Deep neural networks may also include activation functions and sub-functions between the layers. The first layer of nodes of a multilayered or deep neural network may be referred to as an input layer. The final layer of nodes may be referred to as an output layer. The layers in-between the input and final layer may be referred to as intermediate layers.

The term "convolutional neural network" may be used herein to refer to a deep neural network in which the computation in at least one layer is structured as a convolution. A convolutional neural network may also include multiple convolution-based layers, which allows the neural network to employ a very deep hierarchy of layers. In convolutional neural networks, the weighted sum for each output activation is computed based on a batch of inputs, and the same matrices of weights (called "filters") are applied to every output. These networks may also implement a fixed feedforward structure in which all the processing nodes that make up a computational chain are used to process every task, regardless of the inputs. In such feed-forward neural networks, all of the computations are performed as a sequence of operations on the outputs of a previous layer. The final set of operations generate the overall inference result of the neural network, such as a probability that an image contains a specific object (e.g., a person, cat, watch, edge, etc.) or information indicating that a proposed action should be taken.

The term "feature vector" may be used herein to refer to an information structure that represents or characterizes collected data (e.g., sensor data, etc.) or which represents or characterizes a specific factor, feature, condition, data point, or aspect of collected data. A feature vector may include one or more features and their corresponding feature values. A feature value may be a number or symbol that represents a collected data point. A feature value may be associated with a data type that identifies how a feature (or its feature value) should be measured, analyzed, weighted, or used. For example, a data type may identify a range of possible feature values, meanings of the values, operations that may be performed on those values, etc.

The term "classifier" may be used herein to refer to an AI model and/or information structures that may be used by a device processor to evaluate collected data or a specific feature (or factor, condition, data point, operation, component, etc.). For example, a classifier may include decision nodes (e.g., neural networks, decision stumps, boosted decision trees, etc.) that each include a weight value and a test question/condition suitable for evaluating the collected data.

A classifier may include multiple decision nodes and a feature vector may include multiple features. As such, applying a feature vector to a classifier may generate a plurality of answers to a plurality of different test conditions. Each of these answers may be represented by a numerical value. The device processor may multiply each of these numerical values with their respective weight value to generate a plurality of weighted answers. The device processor may then compute or determine a weighted average based on the weighted answers, compare the computed weighted average to one or more threshold values, and perform a responsive action (e.g., classify/label the collected data, etc.) based on the results of the comparison. For example, if the computed weighted average is "0.79" and the threshold value is "0.75," the device processor could determine that the collected dataset is suitable (or that it is not suitable) for use in training a neural network.

Some embodiments may include a computing device that is configured to perform machine learning operations. In some embodiments, the machine learning operations may include training classifier models, collecting data objects, generating feature vectors based on the collected data objects, applying the feature vectors to the classifier models to generate an analysis result, and using the analysis result to determine whether a data object is abnormal. The computing device may also use the analysis result to retain the classifier models.

FIGS. 1-7 illustrate a method 100 of identifying and responding to data anomalies in a data environment in accordance with some embodiments. Method 100 may be performed by one or more processors in a server computing device.

With reference to FIG. 1, in block 102, the computing device may create a corpus of data related to data architecture and standards. For example, the computing device may create a corpus of information relating to data architecture and standards that will be leveraged in the machine learning algorithm to recommend future analysis of data points. In some embodiments, this may be accomplished by using natural language processing (NLP), neural network processing, artificial intelligence, supervised learning algorithms, or any combination thereof. In some embodiments, generating the corpus of data may include generating or updating classifier models, which may include decision nodes (e.g., neural networks, decision stumps, boosted decision trees, etc.) that each include a weight value and a test question/condition suitable for evaluating collected data.

Figure 2:
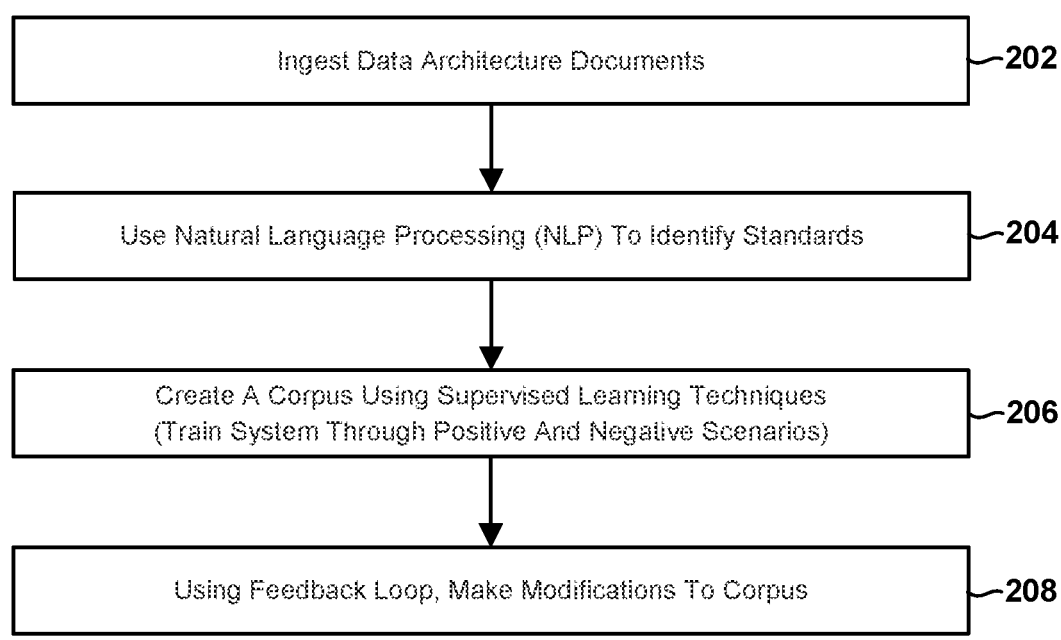

With reference to FIG. 2, in some embodiments, creating the corpus of data in block 102 may include the computing device ingesting data architecture documents in block 202, using NLP (or other similar technique/technology) to identify standards in block 204, using supervised learning (or other similar technique/technology) to create the corpus of data in block 206, and using a feedback loop to make modifications to the corpus in block 208. As referenced in block 208, updates to the corpus may be made based on input from block 206, in which a consistent response to previous recommendations in an ingested document from block 202 as processed in block 204 provides different levels of confidence based on the statistical analysis of the learning techniques. The consistent response may be an indication of approval of the ingested document resulting in a high level of confidence in the data contained therein or an indication of confusion or disapproval of the ingested document resulting in a low level of confidence in the data contained therein.

The computing device may perform various operations in support of autonomous learning of critical metrics. For example, the computing device may evaluate the unique behavior of every critical metric and its weekly, monthly and annual seasonality—in real time and at scale. Every metric that comes in may go through a classification phase and may be matched with the optimal model from a library of model types for different signal types. Correlation is important for understanding metrics in context. The engine may run through a combination of four derivatives of behavioral topology learning: abnormal correlation, naming correlation, graph correlation, and implicit analytics topology.

With reference to FIG. 1, in block 104, the computing device may determine the data sources from which to collect and integrate data. The computing device may collect and integrate data from any of a variety of different types of components or data sources, including software applications, databases, data streams, storage components, customer relationship management (CRM) components, monitoring and analytics tools, IT infrastructure components, etc. Input sources for block 104 may be determined by subject matter experts that may identify and provide documents to be ingested. Subject matter experts may also provide a weighting for the value of multiple documents. For example, in instances in which one document is classified as a corporate standard and another document is defined as a team guideline, higher weighting may be assigned to the corporate guideline.

Figure 3:
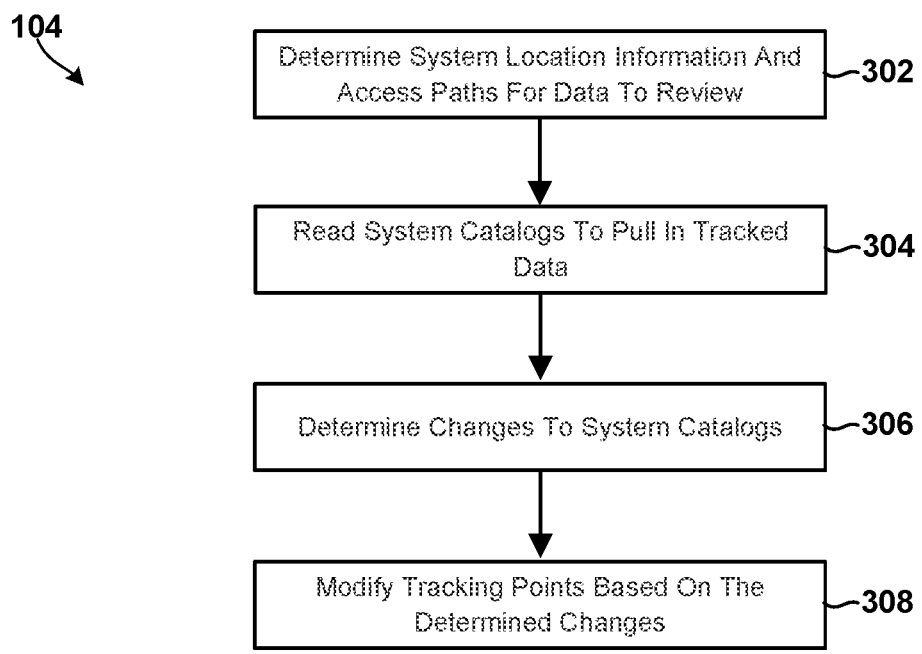

With reference to FIG. 3, in some embodiments, determining the data sources in block 104 may include the computing device determining system location information and access paths for data to review in block 302, reading system catalogs to pull in tracked data in block 304, determining changes to system catalogs in block 306, and modifying tracking points based on the determined changes to the system catalogs in block 308. The location and access to these catalogs may be provided to the computing device so that they may be utilized to identify changes to the system catalogs that would prompt new reviews related to the changes. In this embodiment, the system catalog would be a metadata repository with information about the data that is to be reviewed.

With reference to FIG. 1, in block 106, the computing device may rate incidents and generate a significance score (e.g., a data quality score or "DQS", etc.). The significance score may be calculated from the scores of four (4) underlying dimensions, each of the underlying dimensions having a weight towards the final score, which may in turn be scored based on equal-weighted metrics used for measuring the dataset's performance in that dimension. It may be a weighted score based on the level of importance of each metric. High importance metrics may contribute the greatest, then moderate and low contribute the least. A score of 100 may be achieved by having all metric results at the expected standard level.

The computing device or engine may support defining weights at each level of the hierarchy that are used to calculate the significance score for the associated parent level. In instances in which there are multiple rules linked to a measure/term, weights may be assigned to each individual rule. The weight may be used to calculate the significance score for the measure/term. Weights may be defined for each measure/term and for each subject areas within the data domain, which may in turn be used to calculate the significance score for the parent category. The significance score calculation may be traversed at all the different paths through which the catalog asset and the physical rule are related. For example, an analytics engine may learn business metrics' normal behavior and identify deviations. As a further example, if the computing device has determined that profit margins on a product fall between 30-40% and a product has been identified that has a profit loss of 100%, that would fall outside of normal behavior for the enterprise.

In some embodiments, the computing device may rank each incident based on a significance score. In this embodiment, an incident is a reported data anomaly previously reported by the computing device or consumers of the information. These incidents may be classified by consumers that determine the impact to the business for this anomaly. The more significant the impact, the larger weight that would be provided for future auditing recommendations based on statistical similar variations and/or incidents to similar tables and reports to the business. The significance score may be continuously or repeatedly updated (e.g., using reinforced learning techniques, etc.) so that it becomes more and more accurate over time. Responses by a consumer or reviewer of the incident may be stored in the corpus.

Figure 4:
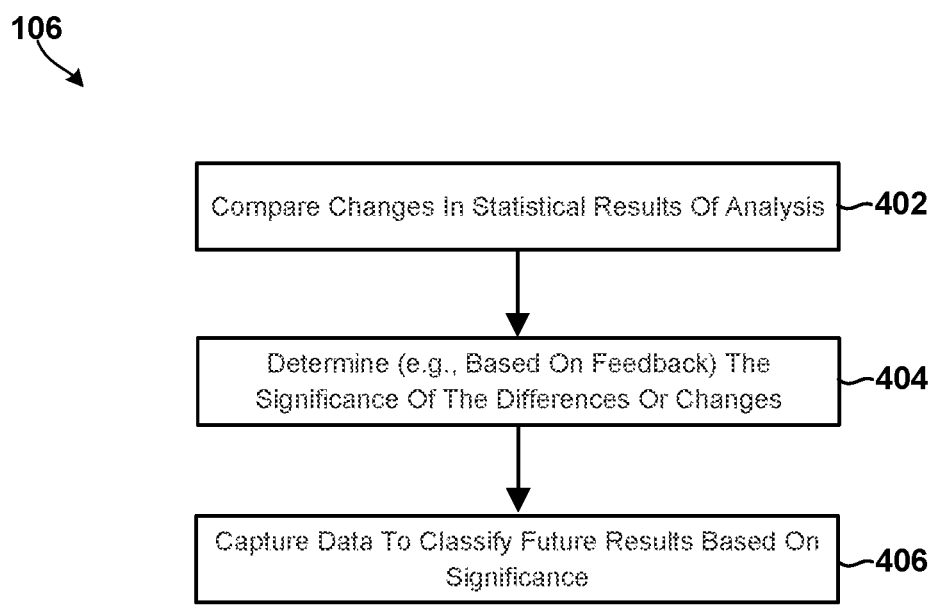

With reference to FIG. 4, in some embodiments, rating incidents and generating a significance score in block 106 may include the computing device comparing changes in statistical results of analysis in block 402, and determining (e.g., based on feedback) whether the differences/changes are significant (e.g., exceed a threshold value, etc.) in block 404. For example, values may be compared to the 95% confidence intervals of the predicted values to determine whether changes are significant.

In block 406, the computing device may capture data and classify future results based on the significance. Statistical thresholds for incidents may be defined based on the ingested standards, impact to similar reports and/or tables, and/or consumer responses to identified incidents as they impact the business. These ratings may provide values for ranges of impacts, and may be on a numerical scale (e.g., 1 to 10, etc.) or a classification scale (e.g., good, neutral, bad, etc.) as defined by a consumer.

In some embodiments, the computing device may also perform the operations discussed above with reference to block 108 in FIG. 1. For example, the computing device may cluster the results. Clustering the results may include, for each incident, the computing device grouping correlated anomalies and identifying all events and contributing factors (which may be used to generate a rich report). This data may be stored in a data repository that is capable of being analyzed by the computing device.

In some embodiments, the computing device may be configured to analyze the data assessment results by creating a set of data quality KPIs, such as ratio of data to errors. For example, the computing device may monitor the number of known data errors compared to the entire data set. The computing device may determine the number of empty values, which may identify the number of times that an empty field was included within a data set. The computing device may also determine the data time-to-value, which tray evaluate how long it Likes to gain insights from a data set. While many factors may affect the data time-to-value, quality is one of the main reasons for increases in the data time.

As further examples, the computing device may determine the data transformation error rate. The data transformation error rate may be a metric that tracks how often a data transformation operation fails. The computing device may also determine data storage costs. When storage costs increase while the amount of data used remains the same, or worse, decreases, it might mean that a significant part of the data stored has a quality that is too low to be used. This information is particularly useful for uncovering a root cause of a set of irregularities, improving the time to resolution, and providing effective autonomous business analytics.

Figure 5:
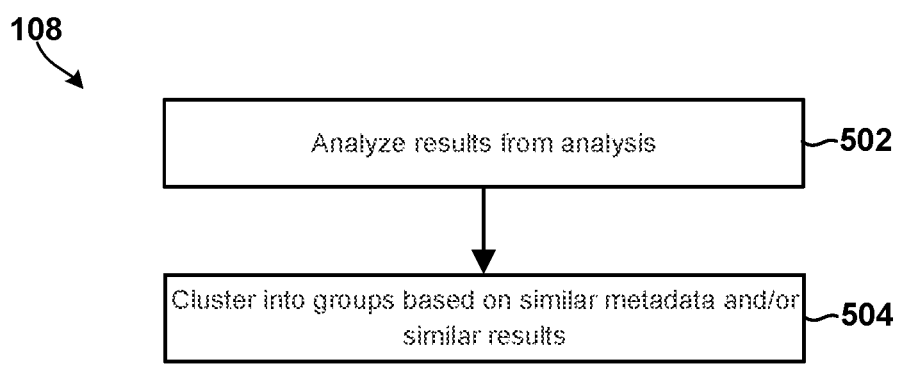

With reference to FIG. 5, in some embodiments, clustering the results in block 108 may include the computing device analyzing the results (e.g., captured data, classified future results, etc.) in block 502, and clustering the data into groups based on similar metadata and/or similar results in block 504. In this embodiment, the results may include analysis of current data based on the defined corpus, which may be maintained based on updates to the data standards, data repository and/or responses to previous incidents.

With reference to FIG. 1, in block 110, the computing device may alert consumers and/or producers of anomalies (e.g., via a channel, text, email, Slack, Jira, etc.). In some embodiments, the computing device may seamlessly integrate the alerts into an existing workflow for quick and effective responsive actions.

Figure 6:
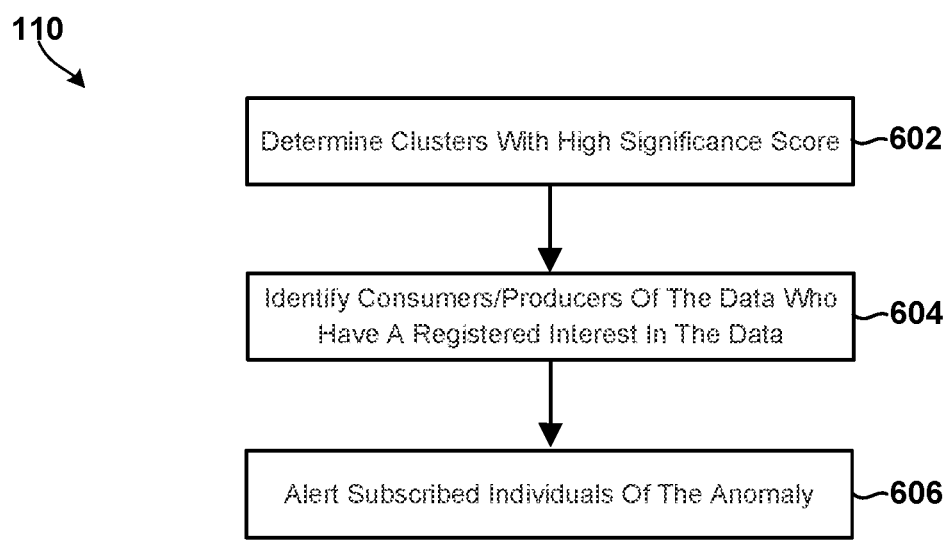

With reference to FIG. 6, in some embodiments, alerting consumers and/or producers of anomalies in block 110 may include the computing device determining clusters that have a sufficiently high significance score in block 602, identifying consumers and/or producers of the data who have a registered interest in the data in block 604, and alerting subscribed individuals of the anomaly in block 606. In these embodiments, a cluster score may be a statistical representation of analysis of the combinations and permutations of data values as compared to the corpus. The significance score may be computed based on the statistical variance, the importance to the business as determined by previous updates to the corpus for similar variances, the use of the data by the business, and/or the frequency of the variance in a data source.

With reference to FIG. 1, in block 112, the computing device may utilize feedback in learning loop to determine thresholds and recommend additional audits. For example, if the computing device determines that the range of a value should be between 1 and 100, and values in the 101 to 109 have been previously marked as insignificant, then this feedback input may be used to change the corpus to extend the range. In other instances, date analysis may be used that indicates the difference between start date and end date should be within 30 days as determined in the system training. If the computing device sees 31 days in a month with 31 days, the corpus may be updated from 30 days to 1 month based on the feedback. In addition, feedback from end users may be collected for each alert instance to further improve the system's machine learning engine. The computing system may train the algorithms with direct feedback on anomalies, thereby allowing users to fine-tune the system's functionality and results. For example, while analysis of problems that have been identified are easily reviewed, problems that were missed in the audits may need input from an external problem reporting repository to analyze the inputs and impacts.

Figure 7:
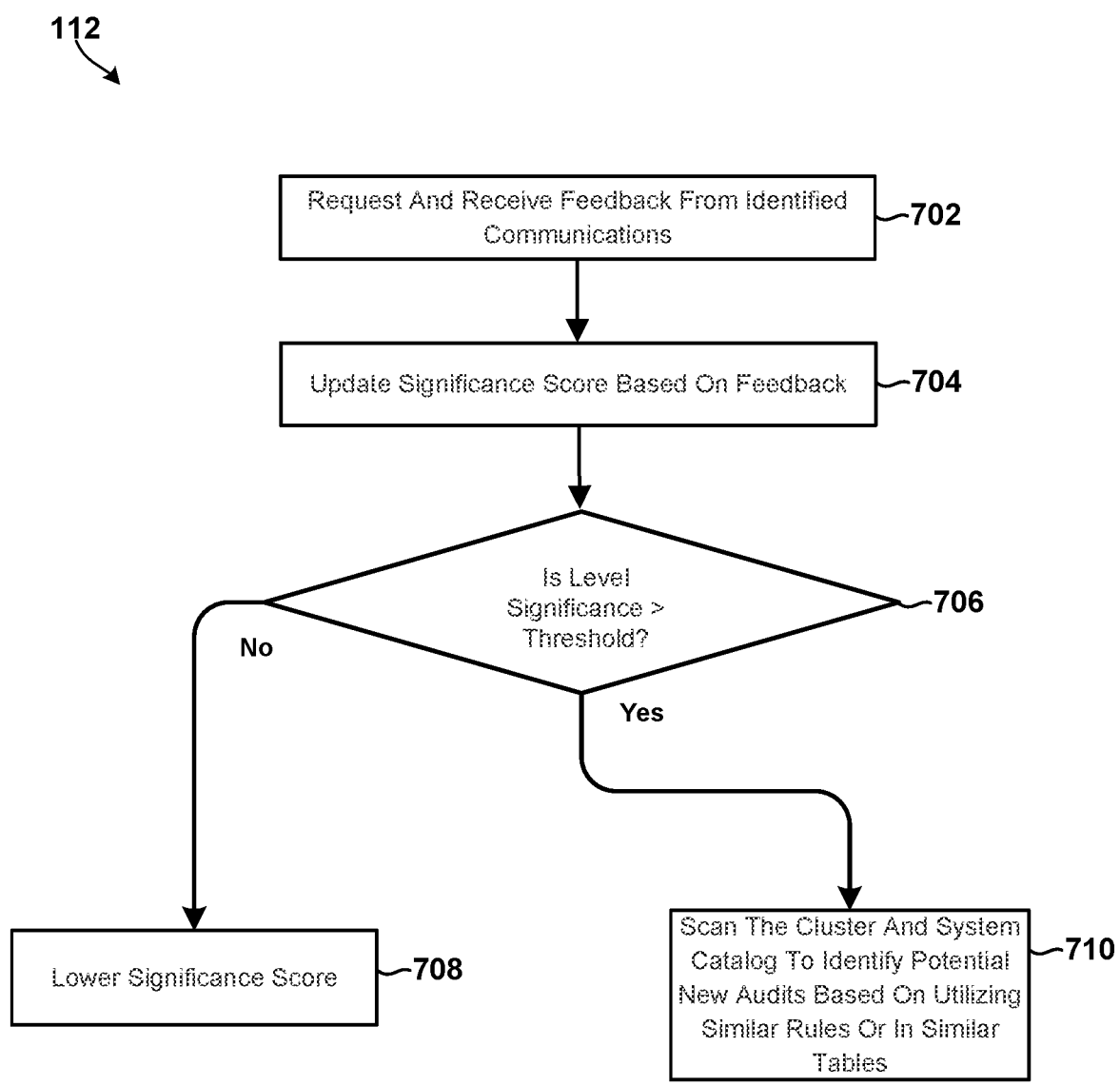

With reference to FIG. 7, utilizing feedback in learning loop to determine thresholds and recommend additional audits in block 112 may include the computing device requesting and receiving feedback from identified communications in block 702, and updating a significance score based on the received feedback in 704. In determination block 706, the computing device may determine whether the level significance is greater than a threshold value. In response to determining that level significance is not greater than the threshold value (i.e., determination block 706="No") the computing device may lower the significance score in block 708. In response to determining that level significance is greater than the threshold value (i.e., determination block 706="Yes") the computing device may scan the cluster and system catalog to identify potential new audits based on utilizing similar rules or in similar tables in block 710.

Figure 8A:
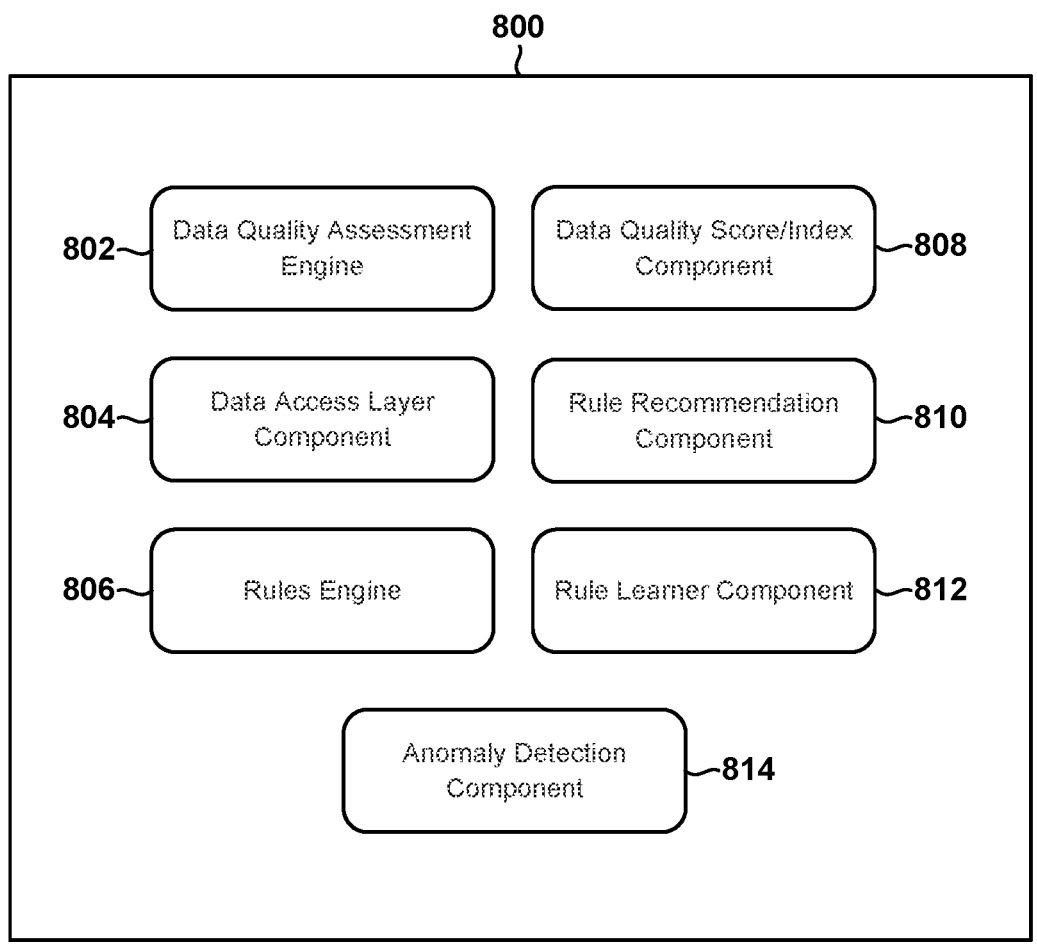
FIGS. 8A and 8B are component block diagrams that illustrate components in a computing device that could be configured to detect and respond to data anomalies in accordance with some embodiments.
Figure 8B:
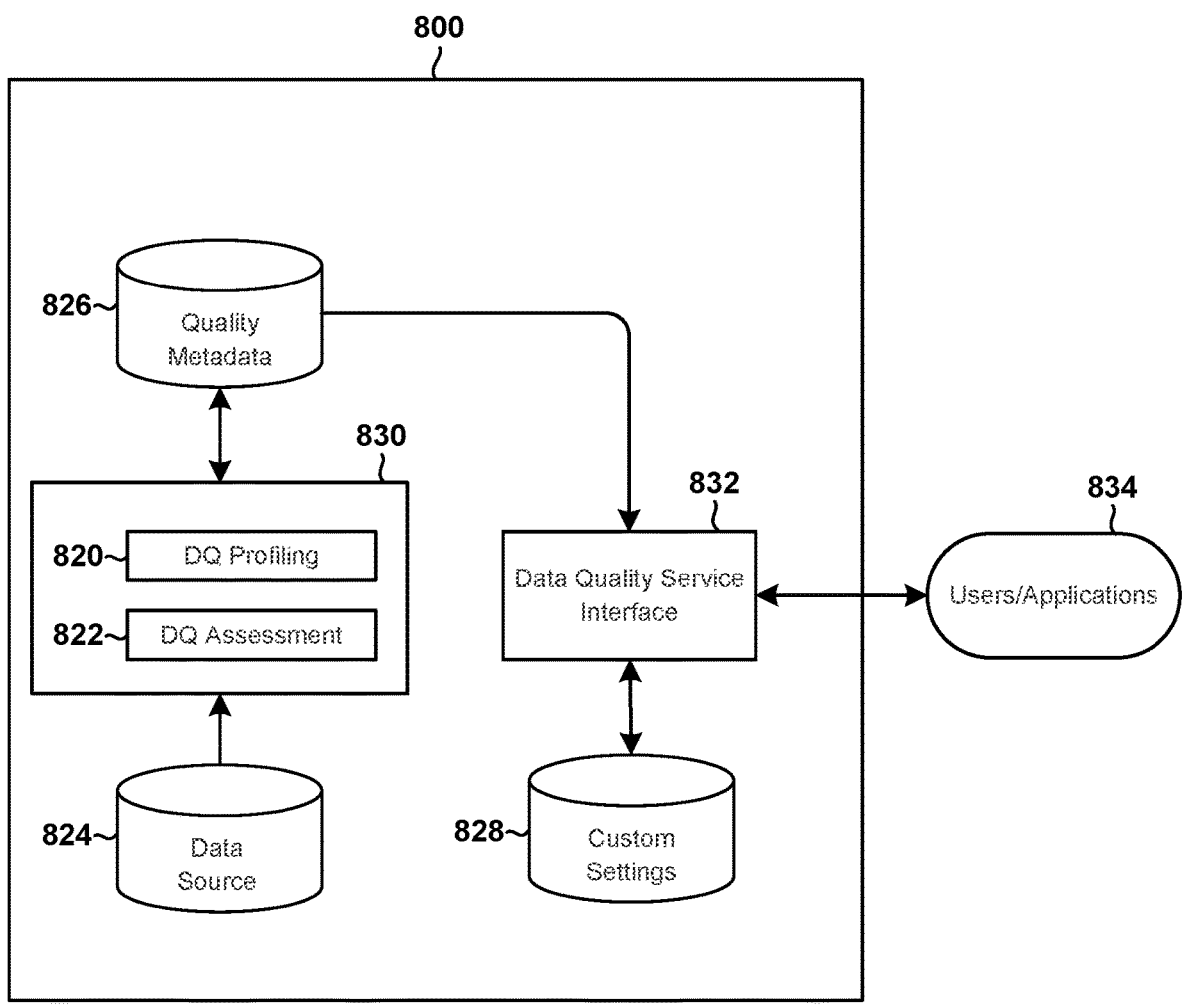

FIGS. 8A and 8B illustrate components in a computing device 800 that could be configured to detect and respond to data anomalies in accordance with the various embodiments. In the example illustrated in FIG. 8A, the computing device 800 includes a data quality (DQ) assessment engine 802, a data access layer component 804, a rules engine 806, a DQ score/index component 808, a rule recommendation component 810, a rule learner component 812, and an anomaly detection component 814. In the example illustrated in FIG. 8B, the computing device 800 includes a DQ processing engine 830 that includes a DQ profiling component 820 and a DQ assessment component 822. The computing device 800 may also include a data source component 824, a quality metadata component 826, a custom settings component 828, and a data quality service interface component 812 that configured to send and receive information to and from a users/applications component 834, which may be internal or external to the computing device 800.

Figure 9:
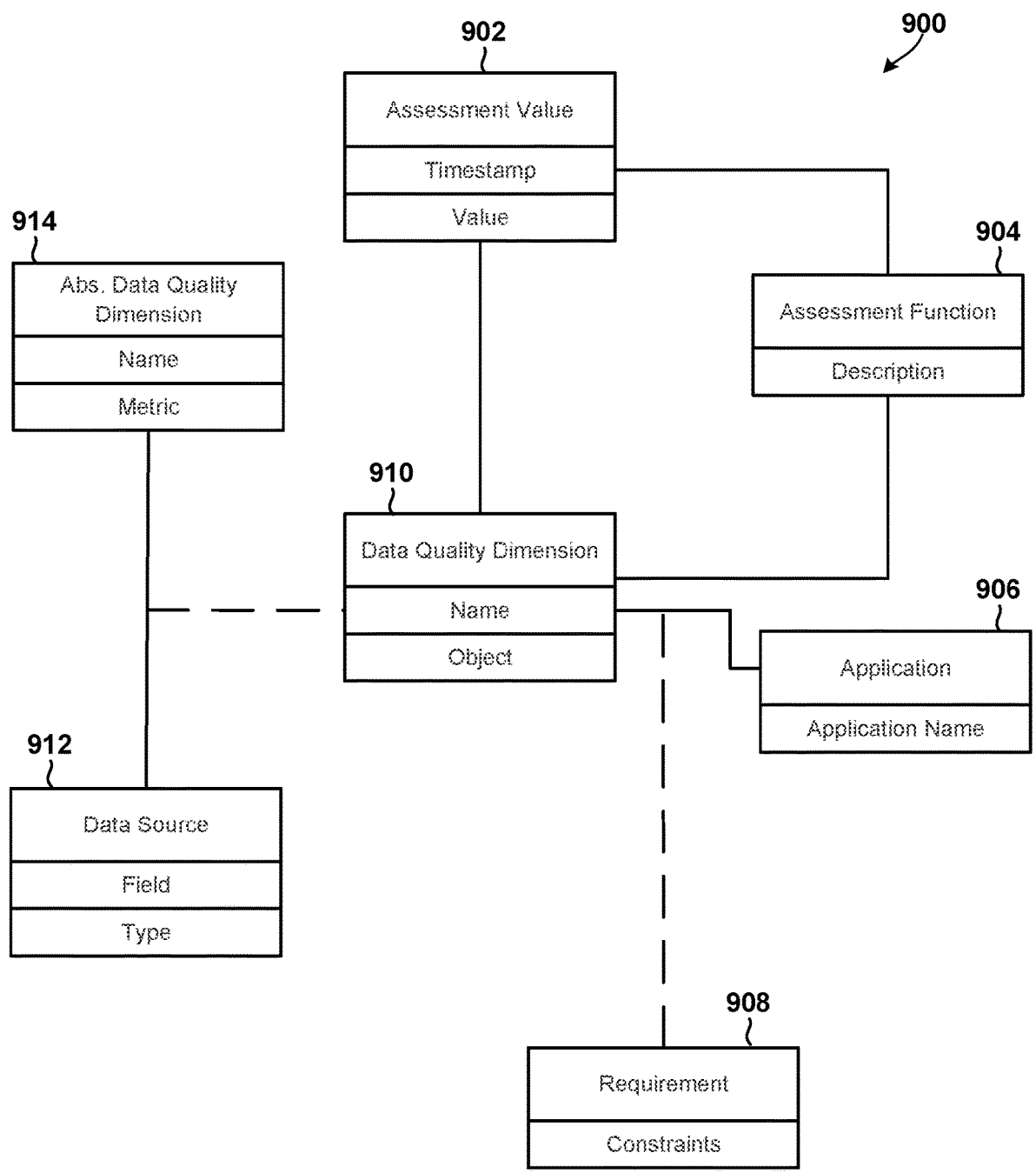
FIG. 9 is a component block diagram that illustrates data fields in an information structure that could be generated and used by a data quality (DQ) assessment engine configured to perform data quality assessment operations based on a quality dimension in accordance with some embodiments.

FIG. 9 illustrate data fields in an information structure 900 that could be generated and used by a DQ assessment engine 802 to perform data quality assessment operations based on a quality dimension. In the example illustrated in FIG. 9, the information structure 900 includes an assessment value information unit (IU) 902, an assessment function IU 904, an application IU 906, a requirement IU 908, a data quality dimension IU 910, a data source IU 912, and an abstract data quality dimension IU 914. The assessment value IU 902 includes a timestamp IU and a value IU. The assessment function IU 904 includes a description IU. The application IU 906 includes an application name IU. The requirement IU 908 includes a constraints IU. The data quality dimension IU 910 includes a name IU and an object IU. The data source IU 912 includes a field IU and a type IU. The abstract data quality dimension IU 914 includes an name IU and a metric IU.

With reference to FIGS. 8A-9, the DQ assessment engine 802 may be configured to define a set of abstract data quality dimension IUs 914 for each data source component 824. The abstract data quality dimension IUs 914 may include all the criteria for assessing data quality in the computing device. The computing device may perform the assessment on a data object and/or a data quality dimension that belongs to a subset of dimensions considered as relevant for the data that the source contains. The data object may be a portion of data set that is considered for the quality evaluation. The data object may include the entire data source, a subset of the data source, or the result of a selective query limiting the data items or values. Moreover, the assessment may be performed at different granularity levels. The results generated by the assessment operations may be an atomic value for each data item or an aggregated number that provides the quality level for entire dataset or a portion thereof.

The data access layer component 804 may be configured to connect to multiple databases. The data access layer component 804 may include a collection of classes, interfaces and their methods and properties that are used to perform CRUD (Create, Read, Update and Delete) operations in the application. The data access layer component 804 may encapsulate the code that is used to connect to the database and perform the above-described operations. The data access layer component 804 may operate as a link between the business entities in the application and the actual data storage layer. The data access layer component 804 may be used to create and populate business entities with data from the database and for updating and storing business entities in the database.

In some embodiments, the data access layer component 804 may be configured to connect to a database, open and close connections, support CRUD operations, provide transaction management, support provider independence, and/or provide concurrency management.

The rules engine 806 may be configured to tune the precision of the results according to the specification of the user. The rules engine 806 may include an adapter component that is configured to address velocity issues (e.g., if fast responses are needed, etc.). Since the data quality computations may be time expensive, in some embodiments, the adapter may be configured to select a subset of the available data to provide a faster evaluation but with lower precision/confidence values. Thus, in some embodiments, the rules engine 806 may be configured to balance tradeoffs between accuracy and computation speed.

The rules engine 806 may include a data rule definition, rule set definition, data rule, rule set, quality rule and/or automation rule, any or all of which may be associated with a status value. Example status values include draft, candidate, standard, accepted, deprecated, and rejected. The draft status may be assigned by default to all newly created rules. The draft status may indicate that the rule is currently being developed. The candidate status may indicate that the rule is complete and ready for review. The standard status may indicate that the rule conforms to an agreed upon standard within the organization. The accepted status may indicate that the rule has been reviewed and accepted as valid. In some embodiments, all data rule definitions and rule set definitions with the candidate status may be published with the accepted status. The deprecated status may indicate that a rule is outdated and no longer appropriate for usage. The rejected status may indicate that the rule has been rejected and needs further modifications.

A data rule definition may be used to develop rule logic for analyzing data. The rule logic may describe a particular condition in a record with the use of basic syntax where a variable, such as a word or term, is evaluated based on a given condition. Rule logic may evaluate to a true or false value (or may set up pass or fail check, etc.) that evaluates the quality of the data. Data rule definitions may be used as a basis for data rules and quality rules.

A rule set definition may include a collection of data rule definitions. A rule set definition may be used to create rule sets, which may run many data rules at the same time to provide broader view on quality of the data.

A data rule may evaluate and validate specific conditions associated with a data source by binding data rule definitions to physical data. Each data rule may be run independently. Data from various data assets may be bound via joins. A data rule may also specify the content of the output table.

A rule set may be a collection of data rules. A rule set may capture how a record within a data source conforms to multiple data rules. For example, a rule set may capture how many rules a specific record breaks. A rule set may also be used to identify the overall quality or confidence in a data source. By executing and evaluating multiple rules together against individual records, a rule set may provide a broader, more holistic, view of a data source and its records.

Similar to data rules, a quality rule may evaluate and validate specific conditions associated with a data source by binding data rule definitions to physical data. A quality rule may be run as part of the data quality analysis operations. The output of a quality rule may be displayed as a rule violation in the data quality score analysis results. In some embodiments, only data from a single data asset is bound to data rule definition. Quality rules may not require a name.

An automation rule may be used to automatically apply a data rule definition, a quality dimension, or a data quality score to data assets or columns based on various conditions. Automated rules may be run during the discovery process or column analysis.

The anomaly detection component 814 may implement anomaly detection techniques that identify unexpected patterns or behavior in data sets. The anomaly detection component 814 may detect irregularities in data loads, including data volume changes, outliers, and changes in data characteristics. The anomaly detection component 814 receive, use and/or provide improvements over time as the computing device learns from user input. In some embodiments, the anomaly detection component 814 may assist or perform root cause analysis (RCA) operations (e.g., for unexpected events, business incidents, etc.).

In some embodiments, the anomaly detection component 814 may categorize anomalies into one or more categories. Examples of such categories include point anomalies, contextual anomalies and collective anomalies. The point anomaly category may indicate that a single or an independent instance of data is anomalous in an individual-data series. The contextual anomaly category may indicate than a data instance is anomalous in some predefined context in time-series data. The collective anomaly category may indicate that a group of data instances exhibits anomalous behavior in comparison to other groups in various data series.

The DQ score/index component 808 may be configured to calculate and/or store a DQ score (DQS). The DQS may calculated from the scores of multiple (e.g., 4, 5, etc.) underlying dimensions, each with a weight towards the final score, which may be scored based on equal-weighted metrics for measuring the dataset's performance in that dimension. The DQS may be a weighted score based on the level of importance of each metric. High importance metrics may contribute the most, followed by moderate importance metrics, and low importance metrics. A score of 100 may achieved by having all metric results at the expected standard level.

The DQ score/index component 808 may be configured to support defining weights at each level of the hierarchy, which may be used to calculate the DQS for an associated parent level. If there are multiple rules linked to a measure/term, the weights may be assigned to each individual rule. These weight may be used to calculate the DQS for the measure/term. Weights may also be defined for each measure/term or for each subject areas within the data domain, which may be used to calculate the DQS for the parent category. If weights not specified at the child level, then the DQ score/index component 808 may use a simple average method.

The DQS may be aggregated for each level in each of the asset hierarchies. The DQS calculation may traverse all the different paths through which the catalog asset and the physical rule are related. To prevent records with multiple quality issues to unnecessarily weigh down the DQS, values that are identified with more than one issue may not be weighed differently against the quality score as values with only one. The DQS may expire when the analysis results are edited, after which change quality violations may be ignored or evaluated during the next analysis cycle.

The rule recommendation component 810 may be configured to automatically detect domains and business terms, and apply data quality rules consistently across an entity. The rule recommendation component 810 may report aggregated quality statistics and use data quality information for master data management (MDM), reference data management (RDM), data catalog, and/or data lineage. In some embodiments the rule recommendation component 810 may include self-learning engine that is configured to detect data domains and business terms, and to assign data quality rules automatically from a rule library.

The rule learner component 812 may be configured to perform autonomous learning operations. The rule learner component 812 may learn the unique behavior of every critical metric periodically (e.g., weekly, monthly, annual, seasonally, etc.) in real time and at scale. Every metric that comes in may go through a classification phase. Each metric may be matched with the optimal model from a library of model types for different signal types. The rule learner component 812 may perform correlation operations that allow for understanding metrics in context. The rule learner component 812 may run through combination of four derivatives of behavioral topology learning: abnormal correlation, naming correlation, graph correlation, and implicit analytics topology.

The various aspects improve upon existing solutions by using a rules engine and machine learning techniques to monitor and analyze a data environment. The use of rules engine and/or machine learning techniques is important because modern data environments are highly configurable and complex systems, and data anomalies may arise from a multitude of different factors. Further, different combinations of features/factors may require an analysis, the precise combination of features/factors often can only be determined using information obtained directly from the data environment. For these and other reasons, existing solutions are not adequate for monitoring, detecting, characterizing, and responding to data anomalies.

Figure 10:
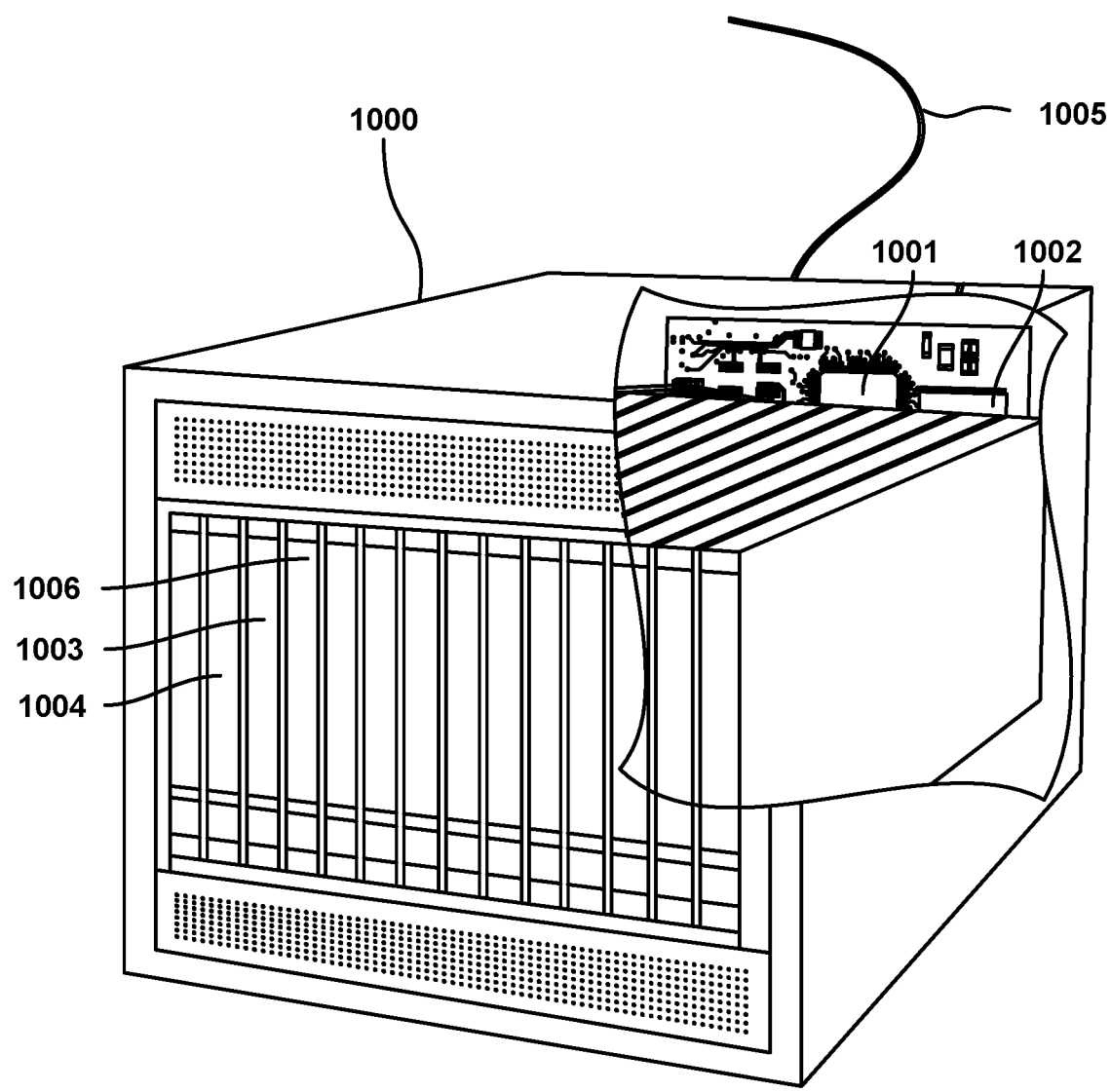
FIG. 10 is a component block diagram of a server device suitable for use in various aspects.

The various aspects (including, but not limited to, aspects discussed above with reference to FIGS. 1-9) may be implemented on a variety of computing devices, such as the server 1000 illustrated in FIG. 10. Such a server 1000 typically includes a processor 1001 coupled to volatile memory 1002 and a large capacity nonvolatile memory, such as a disk drive 1003. The server 1000 may also include a floppy disc drive, compact disc (CD) or DVD disc drive 1004 coupled to the processor 1001. The server 1000 may also include network access ports 1006 coupled to the processor 1001 for establishing data connections with a network 1005, such as a local area network coupled to other broadcast system computers and servers.

The processors 1001 may be any programmable microprocessor, microcomputer or multiple processor chip or chips that can be configured by software instructions (applications) to perform a variety of functions, including the functions of the various aspects described below. In some mobile devices, multiple processors 1202 may be provided, such as one processor dedicated to wireless communication functions and one processor dedicated to running other applications. Typically, software applications may be stored in the internal memory 1002, 1003 before they are accessed and loaded into the processor 1202, 1001. The processor 1001 may include internal memory sufficient to store the application software instructions.

As used in this application, the terms "component," "module," "engine" and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution, and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

Computer program code or "program code" for execution on a programmable processor for carrying out operations of the various aspects may be written in a high level programming language such as C, C++, C #, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

The foregoing method descriptions and the process flow diagrams are provided merely as illustrative examples, and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more processor-executable instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method of detecting and responding to data anomalies, comprising:
creating a corpus of data based on architecture or standards documents;
generating classifier models based on the corpus of data;
collecting information from one or more data sources;
generating feature vectors based on the collected information;
applying the feature vectors to the classifier models to generate an analysis result;
identifying a data anomaly based on the generated analysis result;
determining a cluster that includes a significance score that exceeds a threshold value;
identifying a data consumer or data producer that has a registered interest in the data;
alerting the identified data consumer or data producer of the identified data anomaly;
receiving feedback in response to alerting the identified data consumer or data producer of the identified data anomaly;
updating the corpus of data based on the received feedback; and
performing autonomous learning of critical metrics by periodically:
evaluating a behavior of a critical metric;
classifying the critical metric based on a result of the evaluation; and
correlating the critical metric with a model from a library of model types for different signal types.

2. The method of claim 1, further comprising updating the classifier models based on the identified data anomaly or generated analysis result.

3. The method of claim 1, wherein creating the corpus of data based on the architecture or standards documents comprises using natural language processing and supervised learning to create the corpus of data.

4. The method of claim 1, wherein correlating the critical metric with the model from the library of model types for different signal types comprises performing a combination of:
abnormal correlation;
naming correlation;
graph correlation; and
implicit analytics topology.

5. A computing device, comprising:
a processor configured to:
create a corpus of data based on architecture or standards documents;
generate classifier models based on the corpus of data;
collect information from one or more data sources;
generate feature vectors based on the collected information;
apply the feature vectors to the classifier models to generate an analysis result;
identify a data anomaly based on the generated analysis result;
determine a cluster that includes a significance score that exceeds a threshold value;
identify a data consumer or data producer that has a registered interest in the data;
alert the identified data consumer or data producer of the identified data anomaly;
receive feedback in response to alerting the identified data consumer or data producer of the identified data anomaly;
update the corpus of data based on the received feedback; and
perform autonomous learning of critical metrics by periodically:
evaluating a behavior of a critical metric;
classifying the critical metric based on a result of the evaluation; and
correlating the critical metric with a model from a library of model types for different signal types.

6. The computing device of claim 5, wherein the processor is further configured to update the classifier models based on the identified data anomaly or generated analysis result.

7. The computing device of claim 5, wherein the processor is configured to create the corpus of data based on the architecture or standards documents by using natural language processing and supervised learning to create the corpus of data.

8. The computing device of claim 5, wherein the processor is configured to correlate the critical metric with the model from the library of model types for different signal types by performing a combination of:
abnormal correlation;
naming correlation;
graph correlation; and
implicit analytics topology.

9. A non-transitory computer readable storage medium having stored thereon processor-executable software instructions configured to cause a processor to perform operations for detecting and responding to data anomalies, the operations comprising:
creating a corpus of data based on architecture or standards documents;
generating classifier models based on the corpus of data;
collecting information from one or more data sources;
generating feature vectors based on the collected information;
applying the feature vectors to the classifier models to generate an analysis result;
identifying a data anomaly based on the generated analysis result;
determining a cluster that includes a significance score that exceeds a threshold value;
identifying a data consumer or data producer that has a registered interest in the data;
alerting the identified data consumer or data producer of the identified data anomaly;
receiving feedback in response to alerting the identified data consumer or data producer of the identified data anomaly;
updating the corpus of data based on the received feedback based on the received feedback; and
performing autonomous learning of critical metrics by periodically:

evaluating a behavior of a critical metric;
classifying the critical metric based on a result of the evaluation; and
correlating the critical metric with a model from a library of model types for different signal types.

10. The non-transitory computer readable storage medium of claim 9, wherein the stored processor-executable software instructions are configured to cause a processor to perform operations further comprising updating the classifier models based on the identified data anomaly or generated analysis result.

11. The non-transitory computer readable storage medium of claim 9, wherein the stored processor-executable software instructions are configured to cause a processor to perform operations such that creating the corpus of data based on the architecture or standards documents comprises using natural language processing and supervised learning to create the corpus of data.

12. The non-transitory computer readable storage medium of claim 9, wherein the stored processor-executable software instructions are configured to cause a processor to perform operations further comprising:
generating an alert based on the identified data anomaly;
receiving feedback in response to alerting the identified data consumer or data producer of the identified data anomaly; and
updating the corpus of data based on the received feedback.

13. The non-transitory computer readable storage medium of claim 12, wherein the stored processor-executable software instructions are configured to cause a processor to perform operations:
such that correlating the critical metric with a model from a library of model types for different signal types comprises performing a combination of:
abnormal correlation;
naming correlation;
graph correlation; and
implicit analytics topology.

14. A method of detecting and responding to data anomalies, comprising:
creating a corpus of data based on architecture or standards documents;
generating classifier models based on the corpus of data;
collecting information from one or more data sources;
generating feature vectors based on the collected information;
applying the feature vectors to the classifier models to generate an analysis result;
identifying a data anomaly based on the generated analysis result; and
performing autonomous learning of critical metrics by periodically:
evaluating a behavior of a critical metric;
classifying the critical metric based on a result of the evaluation; and
correlating the critical metric with a model from a library of model types for different signal types.

15. The method of claim 14, wherein correlating the critical metric with the model from the library of model types for different signal types comprises performing a combination of:
abnormal correlation;
naming correlation;
graph correlation; and
implicit analytics topology.

16. A computing device, comprising:
a processor configured to:
create a corpus of data based on architecture or standards documents;
generate classifier models based on the corpus of data;
collect information from one or more data sources;
generate feature vectors based on the collected information;
apply the feature vectors to the classifier models to generate an analysis result;
identify a data anomaly based on the generated analysis result; and
perform autonomous learning of critical metrics by periodically:
evaluating a behavior of a critical metric;
classifying the critical metric based on a result of the evaluation; and
correlating the critical metric with a model from a library of model types for different signal types.

17. The computing device of claim 16, wherein the processor is configured to correlate the critical metric with the model from the library of model types for different signal types by performing a combination of:
abnormal correlation;
naming correlation;
graph correlation; and
implicit analytics topology.

18. A non-transitory computer readable storage medium having stored thereon processor-executable software instructions configured to cause a processor to perform operations for detecting and responding to data anomalies, the operations comprising:
creating a corpus of data based on architecture or standards documents;
generating classifier models based on the corpus of data;
collecting information from one or more data sources;
generating feature vectors based on the collected information;
applying the feature vectors to the classifier models to generate an analysis result;
identifying a data anomaly based on the generated analysis result; and
performing autonomous learning of critical metrics by periodically:
evaluating a behavior of a critical metric;
classifying the critical metric based on a result of the evaluation; and
correlating the critical metric with a model from a library of model types for different signal types.

19. The non-transitory computer readable storage medium of claim 18, wherein the stored processor-executable software instructions are configured to cause a processor to perform operations such that correlating the critical metric with a model from the library of model types for different signal types comprises performing a combination of:
abnormal correlation;
naming correlation;
graph correlation; and
implicit analytics topology.

* * * * *